United States Patent
Wu et al.

(10) Patent No.: US 10,412,481 B1
(45) Date of Patent: Sep. 10, 2019

(54) OPERATION MODE SWITCH OF WIRELESS HEADPHONES

(71) Applicant: BESTECHNIC (SHANGHAI) CO., LTD., Shanghai (CN)

(72) Inventors: Tianxu Wu, Shanghai (CN); Weifeng Tong, Shanghai (CN); Liang Zhang, Shanghai (CN); Qianli Ma, Shanghai (CN); Junhong Liu, Shanghai (CN); Fei Luo, Shanghai (CN)

(73) Assignee: BESTECHNIC (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/299,055

(22) Filed: Mar. 11, 2019

(30) Foreign Application Priority Data

Jan. 30, 2019 (CN) .......................... 2019 1 0092413

(51) Int. Cl.
*H04R 1/10* (2006.01)
*H04W 76/10* (2018.01)
(Continued)

(52) U.S. Cl.
CPC ......... *H04R 1/1041* (2013.01); *H04L 5/0055* (2013.01); *H04R 1/1016* (2013.01);
(Continued)

(58) Field of Classification Search
None
See application file for complete search history.

(56) References Cited

U.S. PATENT DOCUMENTS

| 2009/0197532 A1* | 8/2009 | Wyper | H04M 1/6066 |
| | | | 455/41.2 |
| 2012/0058727 A1* | 3/2012 | Cook | H04R 5/02 |
| | | | 455/41.3 |

(Continued)

*Primary Examiner* — James K Mooney
(74) *Attorney, Agent, or Firm* — Bayes PLLC

(57) ABSTRACT

Embodiments of wireless audio systems and methods for wirelessly communicating audio information are disclosed herein. In one example, a wireless audio system includes a first wireless headphone and a second wireless headphone. The first wireless headphone is configured to establish a first short-range wireless link with an audio source and a second short-range wireless link with a second wireless headphone; transmit, to the audio source over the first short-range wireless link, a first global acknowledgement (ACK) message indicative of whether the first wireless headphone and the second wireless headphone successfully receive audio information transmitted by the audio source; in response to a mode switch event, transmit, to the second wireless headphone over the second short-range wireless link, status information associated with the first short-range wireless link; in response to the second wireless headphone successfully receiving the status information, transmit, to the second wireless headphone over the second short-range wireless link, a switch start message to switch modes of the first and second wireless headphones; and after transmitting the switch start message, transmit, to the second wireless headphone over the second short-range wireless link, a first local ACK message indicative of whether the first wireless headphone successfully snoops the audio information. The second wireless headphone configured to establish a third short-range wireless link with the audio source based on link information associated with the first short-range wireless link for snooping the audio information transmitted over the first short-range wireless link; receive, from the first wireless headphone over the second short-range wireless link, the status information; receive, from the first wireless head- (Continued)

phone over the second short-range wireless link, the switch start message; after receiving the switch start message, receive, from the first wireless headphone over the second short-range wireless link, the first local ACK message; and transmit, to the audio source over the third short-range wireless link based on the status information, a second global ACK message indicative of whether the first wireless headphone and the second wireless headphone successfully receive the audio information based on the first local ACK message.

21 Claims, 9 Drawing Sheets

(51) Int. Cl.
    *H04L 5/00*           (2006.01)
    *H04W 4/80*          (2018.01)

(52) U.S. Cl.
    CPC ............. *H04W 4/80* (2018.02); *H04W 76/10* (2018.02); *H04R 2420/07* (2013.01)

(56) References Cited

U.S. PATENT DOCUMENTS

| | | | |
|---|---|---|---|
| 2016/0112825 A1* | 4/2016 | Miller | H04W 12/04 |
| | | | 455/41.2 |
| 2016/0360350 A1* | 12/2016 | Watson | H04W 4/70 |
| 2018/0184234 A1* | 6/2018 | Chen | H04W 4/80 |
| 2019/0044576 A1* | 2/2019 | Thoen | H04B 5/0031 |
| 2019/0098675 A1* | 3/2019 | Paycher | H04W 76/10 |

\* cited by examiner

OPERATION MODE SWITCH OF WIRELESS HEADPHONES

CROSS-REFERENCE TO RELATED APPLICATIONS

This application claims the benefit of priority to Chinese Patent Application No. 201910092413.X filed on Jan. 30, 2019, which is incorporated herein by reference in its entirety.

BACKGROUND

Embodiments of the present disclosure relate to wireless audio systems.

Loudspeakers, including headphones, have been widely used in daily life. Headphones are a pair of small loudspeaker drivers worn on or around the head over a user's ears, which convert an electrical signal to a corresponding sound.

Wired headphones, however, constrain the users' movement because of the wires (cords), and are particularly inconvenient during exercise. Conventional wireless headphones no longer need the wires between the headphones and the audio sources, but still require the wires between the left and right headphones.

SUMMARY

Embodiments of wireless audio systems and methods for wirelessly communicating audio information are disclosed herein.

In one example, a wireless audio system includes a first wireless headphone and a second wireless headphone. The first wireless headphone is configured to establish a first short-range wireless link with an audio source and a second short-range wireless link with a second wireless headphone; transmit, to the audio source over the first short-range wireless link, a first global acknowledgement (ACK) message indicative of whether the first wireless headphone and the second wireless headphone successfully receive audio information transmitted by the audio source; in response to a mode switch event, transmit, to the second wireless headphone over the second short-range wireless link, status information associated with the first short-range wireless link; in response to the second wireless headphone successfully receiving the status information, transmit, to the second wireless headphone over the second short-range wireless link, a switch start message to switch modes of the first and second wireless headphones; and after transmitting the switch start message, transmit, to the second wireless headphone over the second short-range wireless link, a first local ACK message indicative of whether the first wireless headphone successfully snoops the audio information. The second wireless headphone configured to establish a third short-range wireless link with the audio source based on link information associated with the first short-range wireless link for snooping the audio information transmitted over the first short-range wireless link; receive, from the first wireless headphone over the second short-range wireless link, the status information; receive, from the first wireless headphone over the second short-range wireless link, the switch start message; after receiving the switch start message, receive, from the first wireless headphone over the second short-range wireless link, the first local ACK message; and transmit, to the audio source over the third short-range wireless link based on the status information, a second global ACK message indicative of whether the first wireless headphone and the second wireless headphone successfully receive the audio information based on the first local ACK message.

In another example, a method for wirelessly communicating audio information is disclosed. A first short-range wireless link established by a first wireless headphone with an audio source and a second short-range wireless link with a second wireless headphone. A third short-range wireless link is established by the second wireless headphone with the audio source based on link information associated with the first short-range wireless link for snooping audio information transmitted by the audio source over the first short-range wireless link. A first global acknowledgement (ACK) message indicative of whether the first wireless headphone and the second wireless headphone successfully receive the audio information is transmitted by the first wireless headphone to the audio source over the first short-range wireless link. In response to a mode switch event, status information associated with the first short-range wireless link is transmitted by the first wireless headphone to the second wireless headphone over the second short-range wireless link. The status information is received by the second wireless headphone from the first wireless headphone over the second short-range wireless link. In response to the second wireless headphone successfully receiving the status information, a switch start message is transmitted by the first wireless headphone to the second wireless headphone over the second short-range wireless link to switch modes of the first and second wireless headphones. The switch start message is received by the second wireless headphone from the first wireless headphone over the second short-range wireless link. After transmitting the switch start message, a first local ACK message indicative of whether the first wireless headphone successfully snoops the audio information is transmitted by the first wireless headphone to the second wireless headphone over the second short-range wireless link. After receiving the switch start message, the first local ACK message is received by the second wireless headphone from the first wireless headphone over the second short-range wireless link. A second global ACK message indicative of whether the first wireless headphone and the second wireless headphone successfully receive the audio information based on the first local ACK message is transmitted by the second wireless headphone to the audio source over the third short-range wireless link based on the status information.

This Summary is provided merely for purposes of illustrating some embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE DRAWINGS

The accompanying drawings, which are incorporated herein and form part of the specification, illustrate the presented disclosure and, together with the description, further serve to explain the principles of the disclosure and enable a person of skill in the relevant art(s) to make and use the disclosure.

Figure 1A:
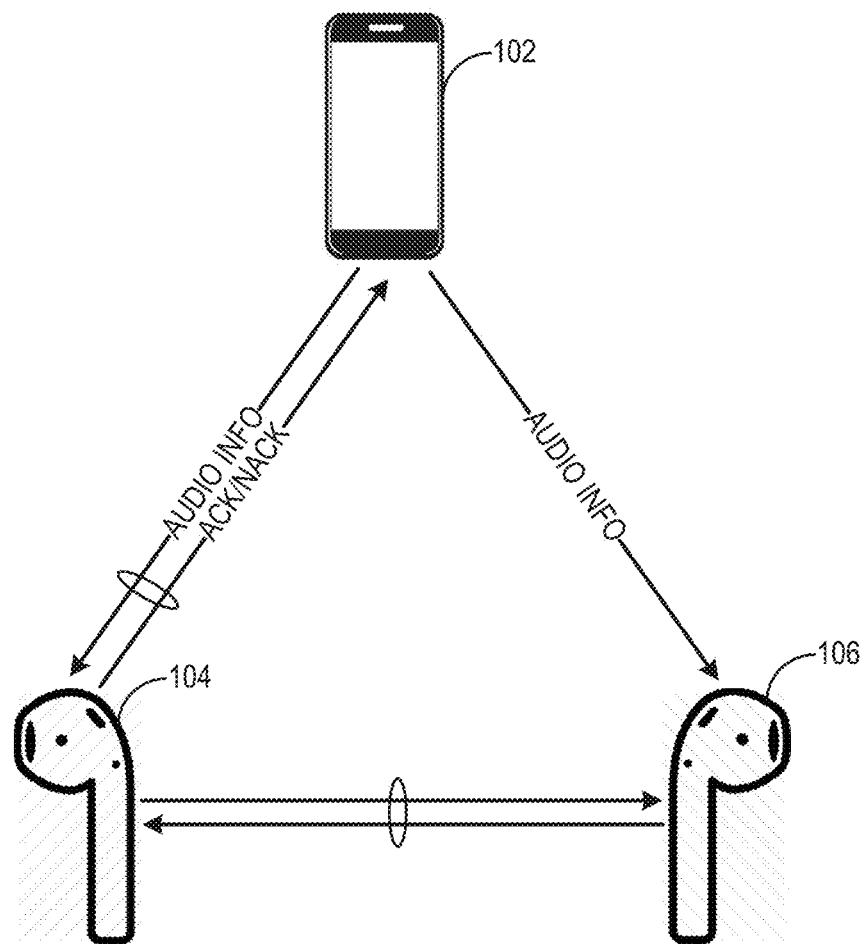
FIGS. 1A and 1B are block diagrams illustrating an exemplary wireless audio system in accordance with various embodiments.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Although specific configurations and arrangements are discussed, it should be understood that this is done for illustrative purposes only. It is contemplated that other configurations and arrangements can be used without departing from the spirit and scope of the present disclosure. It is further contemplated that the present disclosure can also be employed in a variety of other applications.

It is noted that references in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it is contemplated that such feature, structure or characteristic may also be used in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

True wireless stereo (TWS) headphones (also known as untethered headphones) is a type of wireless headphones that remove the wires between the left and right headphones. In some TWS headphones, a primary wireless headphone can simultaneously communicate with an audio source and a secondary wireless headphone. For example, the audio source transmits data (music, audio, or data packets) to the primary wireless headphone using BLUETOOTH, and the primary wireless headphone then forwards the data to the secondary wireless headphone. This approach can cause the high power consumption of the primary wireless headphone. Also, the physical structures of the human head between the left and right ears can affect the data transmission quality between the primary and secondary wireless headphones, such as causing lagging and/or high latency.

As will be disclosed in detail below, among other novel features, the wireless audio systems disclosed herein can achieve "true wireless stereo" with improved data transmission quality and reduced headphone power consumption. In some embodiments of the present disclosure, the primary wireless headphone establishes a normal communication link with the audio source to receive the audio data (e.g., stereo audio), while the secondary wireless headphone establishes a snoop communication link with the audio source to snoop communications on the normal communication link and receive the audio data from the audio source as well. Having the secondary wireless headphone work in the snoop mode can reduce the power consumption of the primary wireless headphone and the audio stuttering and lagging because the primary wireless headphone no longer needs to forward the audio data to the secondary wireless headphone.

Moreover, the primary and secondary wireless headphones can switch their operation modes (e.g., normal mode and snoop mode) in a seamless manner without any disconnection of the primary wireless headphone with the audio source. As a result, the power consumption of the primary and secondary wireless headphones can be balanced without interrupting the audio play. During the operation mode switch, the communications between the audio source and the wireless headphones do not need to be paused as the secondary wireless headphone is working in the snoop mode. In other words, the operation mode switch between normal mode and snoop mode does not interrupt the communication of the TWS audio system. In some embodiments, the switch of operation mode between the primary and secondary wireless headphones can occur very fast, such as less than 10 milliseconds (ms).

Additional novel features will be set forth in part in the description which follows, and in part will become apparent to those skilled in the art upon examination of the following and the accompanying drawings or may be learned by production or operation of the examples. The novel features of the present disclosure may be realized and attained by practice or use of various aspects of the methodologies, instrumentalities, and combinations set forth in the detailed examples discussed below.

FIG. 1A is a block diagram illustrating an exemplary wireless audio system 100 in accordance with some embodiments. Wireless audio system 100 may include an audio source 102, a primary wireless headphone 104, and a secondary wireless headphone 106. Audio source 102 may be any suitable device that can provide audio information including, for example, music or voice in the digital or analog format. Audio source 102 may include, but is not limited to, a handheld device (e.g., dumb or smart phone, tablet, etc.), a wearable device (e.g., eyeglasses, wrist watch, etc.), a radio, a music player, an electronic musical instrument, an automobile control station, a gaming console, a television set, a laptop computer, a desktop computer, a netbook computer, a media center, a set-top box, a global positioning system (GPS), or any other suitable device.

Primary wireless headphone 104 and secondary wireless headphone 106 may be a pair of loudspeakers that can be worn on or around the head over a user's ears. Primary wireless headphone 104 and secondary wireless headphone 106 may be any electroacoustic transducers that convert an electrical signal (e.g., representing the audio information provided by audio source 102) to a corresponding sound. In some embodiments, each primary wireless headphone 104 and secondary wireless headphone 106 may be an earbud (also known as earpiece) that can plug into the user's ear canal. In some embodiments, primary wireless headphone 104 and secondary wireless headphone 106 may be TWS headphones, which are individual units that are not physically held by a band over the head and/or electrically connected by a cord. Primary wireless headphone 104 and/or secondary wireless headphone 106 may be combined with a microphone to form a headset, according to some embodiments. It is understood that although in FIG. 1A, wireless audio system 100 includes both audio source 102 and the pair of primary and secondary wireless headphones 104 and 106, in some embodiments, wireless audio system 100 may include only primary wireless headphone 104 and secondary wireless headphone 106.

As shown in FIG. 1A, bidirectional communications may be established between audio source 102 and primary wireless headphone 104 and between audio source 102 and secondary wireless headphone 106. In some embodiments, a normal short-range wireless link may be established between audio source 102 and primary wireless headphone 104 using a short-range wireless communication (e.g., the BLUETOOTH communication or WiFi communication). That is, primary wireless headphone 104 may work in the normal mode. In the normal mode, primary wireless headphone 104 may receive audio information (e.g., in data packets) transmitted by a carrier wave from audio source 102 over the normal short-range wireless link. In some embodiments, audio information may be a stream of audio stereo information in the form of compressed or uncompressed stereo samples for first and second audio channels, such as left-channel audio information and right-channel audio information or the like. It is understood that the audio information may broadly include other types of data, such as firmware update data that updates the firmware of primary wireless headphone 104 and/or secondary wireless headphone 106. The normal short-range wireless link may be bidirectional such that primary wireless headphone 104 may transmit messages back to audio source 102 in response to the reception of the audio information from audio source 102. As described below in detail, in some embodiments, primary wireless headphone 104 transmits a global acknowledgement (ACK) message to audio source 102 indicative of whether primary wireless headphone 104 and secondary wireless headphone 106 successfully receive the audio information transmitted by audio source 102. In one example, the global ACK message may be ACK when primary wireless headphone 104 and secondary wireless headphone 106 both successfully receive the audio information. In another example, the global ACK message may be negative ACK (NACK) when at least one of primary wireless headphone 104 and secondary wireless headphone 106 does not successfully receive the audio information.

In some embodiments, a snoop short-range wireless link may be established between audio source 102 and secondary wireless headphone 106 using the same short-range wireless communication between audio source 102 and primary wireless headphone 104 (e.g., the BLUETOOTH or WiFi). That is, secondary wireless headphone 106 may work in the snoop mode in which the connection with secondary wireless headphone 106 may not be known by audio source 102. In the snoop mode, secondary wireless headphone 106 may snoop (also known as "listen" or "eavesdrop") the communications between audio source 102 and primary wireless headphone 104 on the normal short-range wireless link. By snooping the communications between audio source 102 and primary wireless headphone 104, secondary wireless headphone 106 may also receive the audio information (e.g., in data packets, including other types of data, such as firmware update data) transmitted by the carrier wave from audio source 102 via the snoop short-range wireless link. The snoop short-range wireless link may be unidirectional such that secondary wireless headphone 106 may not transmit messages back to audio source 102 in response to the reception of the audio information from audio source 102.

In some embodiments, audio information may be transmitted by audio source 102 according to the BLUETOOTH protocol at the working radio frequency (RF) band between 2,402 MHz and 2,480 MHz or between 2,400 MHz and 2,483.5 MHz (referred to herein as "2.4 GHz"). BLUETOOTH is a wireless technology standard for exchanging data over short distances, and the BLUETOOTH protocol is one example of short-range wireless communication protocols. BLUETOOTH protocol includes, but is not limited to, classic BLUETOOTH, BLUETOOTH high speed, and Bluetooth Low Energy (BLE) protocols, according to some embodiments. In one example, audio source 102 may apply the advanced audio distribution profile (A2DP) of the BLUETOOTH protocol for transmitting the audio information. For example, based on the A2DP, a BLUETOOTH audio streaming of music or voice may be streamed from audio source 102 to primary and secondary wireless headphones 104 and 106 over BLUETOOTH connections. In some embodiments, audio information may be transmitted by audio source 102 according to the WiFi protocol at the working RF band of 2.4 GHz or 5 GHz. WiFi is a wireless technology for wireless local area networking based on the IEEE 802.11 standards, and the WiFi protocol (also known as the 802.11 protocol) is another example of short-range wireless communication protocols. It is understood that the transmission of the audio information by audio source 102 may be using any other suitable short-range wireless communication besides BLUETOOTH and WiFi.

As shown in FIG. 1A, to enable secondary wireless headphone 106 work in the snoop mode, primary wireless headphone 104 may transmit, to secondary wireless headphone 106, link information associated with the normal short-range wireless link between audio source 102 and primary wireless headphone 104. The link information may include, but are not limited to, the address of audio source 102 (e.g., the IP address or media access control (MAC) address) and the encryption parameters between audio source 102 and primary wireless headphone 104. The link information may be transmitted over the bidirectional short-range wireless link between primary wireless headphone 104 and secondary wireless headphone 106, which can be the same type of short-range wireless link as the normal short-range wireless link between audio source 102 and primary wireless headphone 104 or a different type thereof. For example, the bidirectional short-range wireless link between primary wireless headphone 104 and secondary wireless headphone 106 may be a logical link control and adaptation protocol (L2CAP) link for BLUETOOTH communication. That is, the transmission of the link information may be carried on by a short-range wireless communication that is the same type as that for transmitting the audio information by audio source 102 or a different type short-range wireless communication. For example, the short-range wireless communication may be BLUETOOTH communication or WiFi communication. In some embodiments, the transmission of the link information may be at a frequency lower than the frequency used for transmitting the audio information by audio source 102 (e.g., 2.4 GHz). For example, near-field magnetic induction (NFMI) communication may be used for transmitting of the link information. NFMI communication is a short-range wireless communication by coupling a tight, low-power, non-propagating magnetic field between devices. NFMI communication can contain transmission energy within the localized magnetic field, which does not radiate into free space. In some embodiments, the carrier wave frequency for NFMI communication is between about 5 MHz and about 50 MHz (e.g., between 5 MHz and 50 MHz), such as between 5 MHz and 40 MHz, between 5 MHz and 30 MHz, between 5 MHz and 20 MHz, between 5 MHz and 10 MHz, between 15 MHz and 50 MHz, between 25 MHz and 50 MHz, between 35 MHz and 50 MHz, and between 45 MHz and 50 MHz. In some embodiments, the carrier wave frequency is about 10 MHz (e.g., 10 MHz) or about 13.56 MHz (e.g., 13.56 MHz).

Upon receiving the link information from primary wireless headphone 104, secondary wireless headphone 106 can establish the snoop short-range wireless link with audio source 102 based on the link information. For example, secondary wireless headphone 106 may pretend to be primary wireless headphone 104 so that audio source 102 does not recognize secondary wireless headphone 106 as a newly-connected device and thus, will not disconnect and reconnect with secondary wireless headphone 106. In some embodiments, the snoop short-range wireless link may be an asynchronous connection-oriented logical (ACL) link or a synchronous connection-oriented (SCO) link for BLUETOOTH communication.

In some embodiments, secondary wireless headphone 106 transmits a local ACK message to primary wireless headphone 104 over the bidirectional short-range wireless link between primary wireless headphone 104 and secondary wireless headphone 106. A local ACK message is different from a global ACK message described therein in the sense that a global ACK message is transmitted to audio source 102 whereas a local ACK message is transmitted between primary wireless headphone 104 and secondary wireless headphone 106. In some embodiments, the local ACK message is indicative of whether secondary wireless headphone 106 successfully receives (e.g., snoops) the audio information. Similar to the global ACK message, the local ACK message may be ACK when secondary wireless headphone 106 successfully receives (e.g., snoops) the audio information or may be NACK when secondary wireless headphone 106 does not successfully receive (e.g., snoop) the audio information. Based on local ACK message received from secondary wireless headphone 106, primary wireless headphone 104 may transmit the global ACK message (either ACK or NACK) to audio source 102.

As described below in detail, during the process of operation mode switch, additional data, information, or message may be exchanged between primary wireless headphone 104 and secondary wireless headphone 106 over the bidirectional short-range wireless link therebetween. In some embodiments, various types of messages may be transmitted from primary wireless headphone 104, which initiates the switch in response to a mode switch event, to secondary wireless headphone 106, including, for example, a switch initiate message and a switch start message. In some embodiments, status information associated with the normal short-range wireless link between audio source 102 and primary wireless headphone 104 may be transmitted from primary wireless headphone 104 to secondary wireless headphone 106. The status information may be used by secondary wireless headphone 106 together with the link information to establish a new short-range wireless link between audio source 102 and secondary wireless headphone 106 upon the completion of operation mode switch, i.e., when secondary wireless headphone 106 becomes the "primary" wireless headphone and works in the normal mode. In some embodiments, the status information includes status information transmitted from primary wireless headphone 104 to audio source 102, which cannot be snooped by secondary wireless headphone 106 as secondary wireless headphone 106 may only snoop the audio information transmitted from audio source 102 to primary wireless headphone 104. For example, the status information may include the status information about the BLUETOOTH upper layer protocol. By receiving both the link information and status information, secondary wireless headphone 106 may obtain all necessary information for establishing a new normal bidirectional short-range wireless link with audio source 102. For example, a normal bidirectional short-range wireless link with audio source 102 (either with primary wireless headphone 104 or secondary wireless headphone 106) may be an ACL link or a SCO link for BLUETOOTH communication. In some embodiments, in response to reception of each message (e.g., switch initiate message and switch start message) and status information, secondary wireless headphone 106 transmits a corresponding switch ACK message to primary wireless headphone 104 indicative of whether the message or status information is successfully received.

Figure 1B:
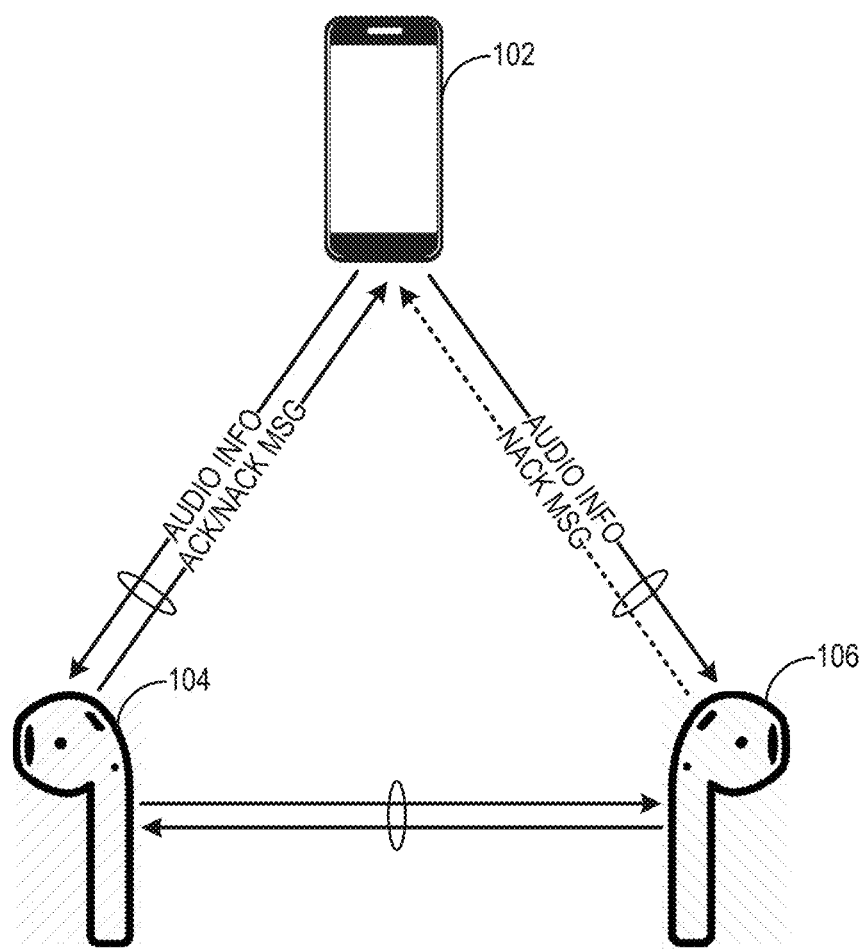

FIG. 1B is a block diagram illustrating exemplary wireless audio system 100 in accordance with some embodiments. The same functions of audio source 102, primary wireless headphone 104, and secondary wireless headphone 106 that have been described above with respect to FIG. 1A will not be repeated with respect to FIG. 1B. Different from the example of FIG. 1A in which a snoop short-range wireless link is established between secondary wireless headphone 106 and audio source 102, a bidirectional snoop short-range wireless link is established between secondary wireless headphone 106 and audio source 102. As a result, secondary wireless headphone 106 can participate in acknowledging the reception of the audio information from audio source 102 by transmitting a global ACK message (e.g., NACK) to audio source 102.

In some embodiments, in response to not successfully receiving (e.g., snooping) the audio information from audio source 102, instead of transmitting a local ACK message (e.g., NACK) to primary wireless headphone 104, secondary wireless headphone 106 may be configured to transmit a global ACK message (e.g., NACK) to audio source 102 directly over the snoop short-range wireless link with audio source 102. As to primary wireless headphone 104, in response to not receiving the local ACK message or receiving local NACK from secondary wireless headphone 106, primary wireless headphone 104 may not transmit any global ACK message to audio source 102. In some embodiments, in response to successfully receiving (e.g., snooping) the audio information from audio source 102, instead of transmitting a global ACK message (e.g., ACK) to audio source 102, secondary wireless headphone 106 may be configured to transmit a special form of local ACK message—an error correcting code (ECC) message to primary wireless headphone 104. As to primary wireless headphone 104, in response to receiving the ECC message from secondary wireless headphone 106, primary wireless headphone 104 may be configured to transmit a global ACK message (e.g., either ACK or NACK) to audio source 102 based on the ECC message and the reception of the audio information by primary wireless headphone 104.

In some embodiments, the ECC message may be generated by secondary wireless headphone 106 based on the audio information (e.g., by coding the payload of the BLUETOOTH audio data packet) received by secondary wireless headphone 106. The ECC message may be generated based on, for example, Reed-Solomon (RS) code, Bose-Chaudhuri-Hocquenghem (BCH) code, etc. In case primary wireless headphone 104 does not successfully receive the audio information from audio source 102 (e.g., error found in the payload of a BLUETOOTH audio data packet), the ECC message from secondary wireless headphone 106 may be used by primary wireless headphone 104 to correct the audio information (e.g., the error found in the payload of the BLUETOOTH audio data packet). Also, the transmission of an ECC message can also serve as an ACK message indicative of the successful reception of the audio information by secondary wireless headphone 106. Thus, when primary wireless headphone 104 successfully receives the audio information from audio source 102 based on the ECC message from secondary wireless headphone 106, primary wireless headphone 104 may transmit global ACK to audio source 102 indicative of the successful receptions of the audio information by both primary and secondary wireless headphones 104 and 106.

In implementing the features related to ECC disclosed herein, the roles of primary and secondary wireless headphones can be switched. In other words, either primary or secondary wireless headphone 104 or 106 can be the party generating and transmitting the ECC message (ECC transmitting headphone), and either primary or secondary wireless headphone 104 or 106 can be the party utilizing the ECC message for correcting the audio information and transmitting the global ACK message to audio source 102 (ECC receiving headphone). In some embodiments, the ECC transmitting headphone and the ECC receiving headphone can be dynamically switched based on the signal quality of each of the ECC transmitting headphone and ECC receiving headphone. In some embodiments, the headphone with better signal quality is used as ECC transmitting headphone. That is, the signal quality of the ECC transmitting headphone may be better than the signal quality of the ECC receiving headphone. As a result, the likelihood that the ECC transmitting headphone can successfully receive the audio information from audio source 102 may be increased, thereby transmitting more ECC messages. With more ECC messages, the ECC receiving headphone may correct more audio information with errors, thereby reducing the numbers of re-transmission and improving the system reliability. In some embodiments, the headphone with better signal quality is used as ECC receiving headphone. That is, the signal quality of the ECC receiving headphone may be better than the signal quality of the ECC transmitting headphone. As a result, the likelihood that audio source 102 can successfully receive the global ACK messages from the ECC receiving headphone may be increased. The signal quality may be determined based on signal-noise-ratio (SNR), received signal strength indicator (RSSI), packet loss, packet cyclic redundancy check (CRC) error, an average thereof in a time period, or any combination thereof.

Figure 2:
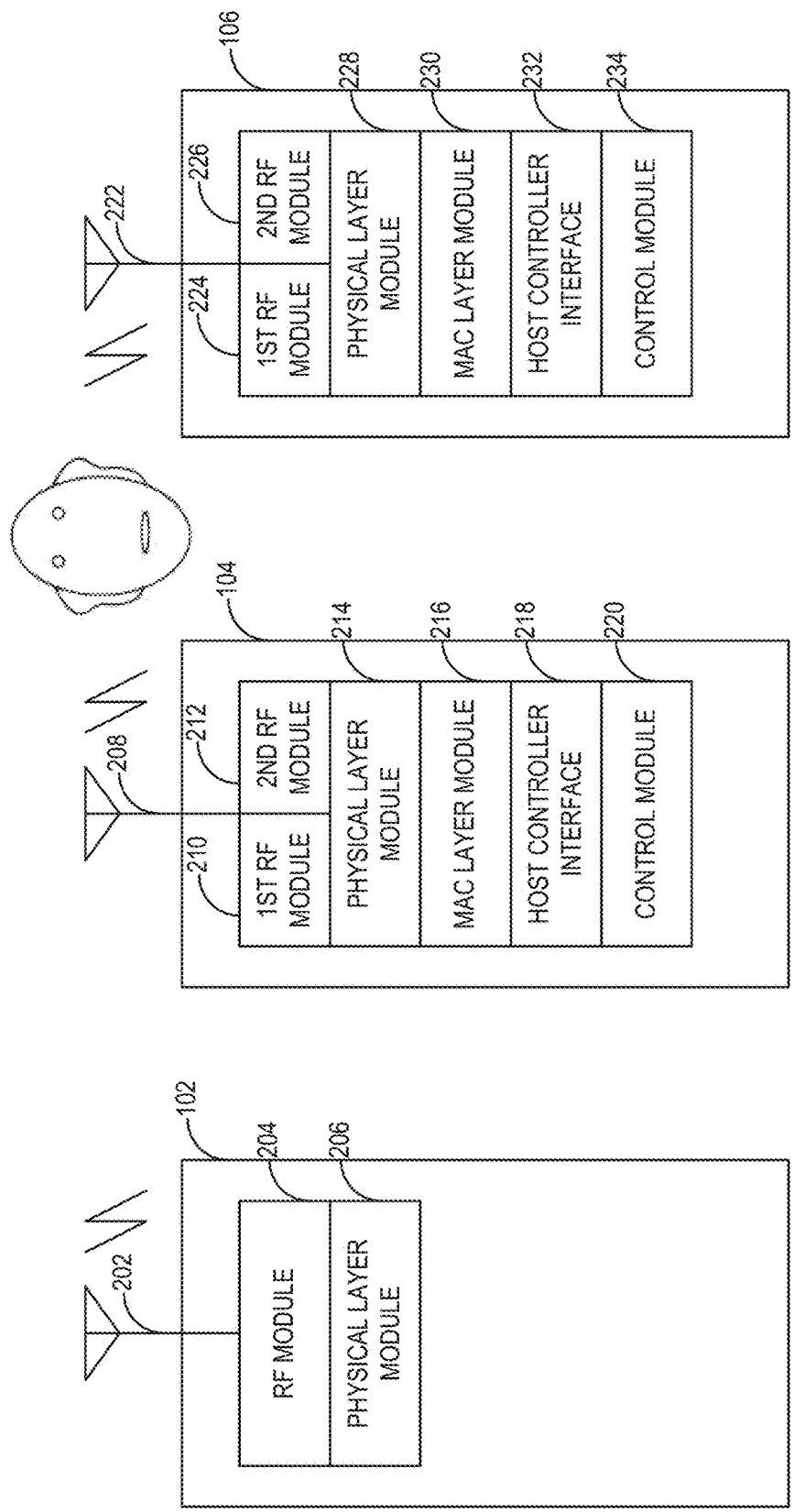
FIG. 2 is a detailed block diagram of the exemplary wireless audio system in FIGS. 1A and 1B in accordance with some embodiments.

FIG. 2 is a detailed block diagram of exemplary wireless audio system 100 in FIGS. 1A and 1B in accordance with some embodiments. Audio source 102 in this example includes an antenna 202, a radio-frequency (RF) module 204 and a physical layer module 206. It is understood that additional module(s) may be included in audio source 102, either in the same integrated circuit (IC) chip in which RF module 204 and physical layer module 206 are formed or in a separate IC chip.

Antenna 202 may include an array of conductors for transmitting and receiving radio waves at one or more RF bands corresponding to RF module 204. For example, antenna 202 may transmit audio information modulated by a carrier wave using RF module 204. As described above, the audio information may be any music and/or voice information provided by audio source 102 or may include any other types of data provided by audio source 102 (e.g., firmware update data). For example, the audio information may be a stream of audio stereo information in the form of compressed or uncompressed stereo samples for first and second audio channels, such as left-channel audio information and right-channel audio information or the like. In some embodiments, the audio information may be mono audio information in a single audio channel or audio information in more than two separate audio channels (e.g., left, central, and right channels). Antenna 202 may also receive the messages modulated by a carrier wave. For example, the messages may be any messages used for acknowledging the reception of the audio information by primary wireless headphone 104 or secondary wireless headphone 106, such as global ACK messages.

RF module 204 and physical layer module 206 may be in the same IC chip that implements a short-range wireless communication protocol, such as the BLUETOOTH protocol or WiFi protocol. RF module 204 may be configured to modulate the audio information using the carrier wave at a frequency, for example, at 2.4 GHz for BLUETOOTH or WiFi communication, and transmit the audio information at the frequency via antenna 202. RF module 204 may be further configured to receive and demodulate the messages and/or the audio information (e.g., the voice information during voice calls) from the carrier wave at the same frequency, for example, at 2.4 GHz. Physical layer module 206 may be configured to generate the physical link (baseband) between audio source 102 and primary wireless headphone 104 (and secondary wireless headphone 106 even though audio source 102 may not be aware of the connection with secondary wireless headphone 106) according to the short-range wireless communication protocol. For example, physical layer module 206 may generate baseband packets (e.g., BLUETOOTH packets) based on the music and/or voice data (payload) and perform error correction using any known methods, such as forward error correction (FEC) and automatic repeat request (ARQ).

In some embodiments, the transmission of the audio information may occur at the audio data packet level in time slots. For example, according to the standard BLUETOOTH protocol, the physical channel of the BLUETOOTH connection is divided into time slots, each of which has the same duration (e.g., 625 μs). RF module 204 in conjunction with antenna 202 may transmit an audio data packet (N) in a time slot (N). Based on the receptions of the audio data packet (N) in the time slot (N) at primary wireless headphone 104 and secondary wireless headphone 106, in the subsequent time slot (N+1), RF module 204 in conjunction with antenna 202 may receive a message from primary wireless headphone 104 or secondary wireless headphone 106 alone, or messages from both primary wireless headphone 104 and secondary wireless headphone 106, which are generated in response to the reception status of the audio data packet (N) in the time slot (N). It is understood that additional components, although not shown in FIG. 2, may be included in audio source 102.

Primary wireless headphone 104 in this example may include a wireless transceiver (primary wireless transceiver) configured to receive the audio information transmitted by audio source 102 and transmit or receive ECC messages in response to the reception of the audio information to audio source 102. The wireless transceiver may be also configured to transmit the link information and status information to secondary wireless headphone 106 to enable secondary wireless headphone 106 to establish a new normal short-range wireless link with audio source 102 upon operation mode switch. The wireless transceiver may be further configured to transmit other operation mode switch-related messages, such as switch initiate messages and switch start messages, to secondary wireless headphone 106, as well as receive switch ACK messages from secondary wireless headphone 106 during the operation mode switch. The operation mode switch-related messages may be transmitted in the form of Link Manager Protocol (LMP) messages for BLUETOOTH communication. Primary wireless headphone 104 may include other components, such as an enclosure, speakers, and a microphone (not shown). Primary wireless transceiver may include an antenna 208, a first RF module 210, a second RF module 212, a physical layer module 214, a MAC layer module 216, a host controller interface (HCI) 218, and a control module 220. Some or all of the modules mentioned above may be integrated in the same IC chip to reduce the chip size and/or power consumption. Primary wireless headphone 104 may present at least part of the audio information received from audio source 102 to the user via one of the user's ear. For example, the speaker of primary wireless headphone 104 may play music and/or voice based on the entire audio information or one audio channel of the audio information.

Antenna 208 may include an array of conductors for transmitting and receiving radio waves at two or more RF bands corresponding to first RF module 210 and second RF module 212. First RF module 210 may be configured to receive, from audio source 102, audio information and transmit, to audio source 102, messages (e.g., global ACK messages) via antenna 208. Second RF module 212 may be configured to transmit, to secondary wireless headphone 106, the link information, status information, and operation mode switch-related messages via antenna 208. In some embodiments, second RF module 212 may be further configured to receive, from secondary wireless headphone 106, switch ACK messages and ECC messages (when primary wireless headphone 104 works as the ECC receiving headphone) via antenna 208.

In some embodiments, the first frequency used for the communications between audio source 102 and primary wireless headphone 104 is a "high" RF, such as 2.4 GHz used in BLUETOOTH or WiFi communication; the second frequency used for the communications between primary wireless headphone 104 and secondary wireless headphone 106 is a "low" RF, such as between 5 MHz and 50 MHz for NFMI communication. Both first RF module 210 and second RF module 212 may implement substantially the same short-range wireless communication protocol for short-range wireless communications at different RF bands. For example, first RF module 210 may implement a first short-range wireless communication protocol (e.g., the BLUETOOTH protocol or WiFi protocol), and second RF module 212 may implement a second short-range wireless communication protocol amended from the first short-range wireless communication protocol (e.g., the amended BLUETOOTH or amended WiFi protocol). The second short-range wireless communication protocol may be substantially the same as the first short-range wireless communication protocol except the carrier wave frequency (and any specification related to the carrier wave frequency).

In some embodiments, first RF module 210 may operate at about 2.4 GHz (e.g., 2.4 GHz). In some embodiments, second RF module 212 may operate between about 5 MHz (e.g., 5 MHz) and about 50 MHz (e.g., 50 MHz) for NFMI communication. For example, second RF module 212 may operate at about 10 MHz (e.g., 10 MHz). In some embodiments, second RF module 212 may implement the frequency-hopping spread spectrum (FHSS) technique, such that the second frequency (low RF) may include a plurality of frequencies based on FHSS. For example, second RF module 212 may implement the amended BLUETOOTH protocol and use the FHSS specification in the amended BLUETOOTH protocol. FHSS can further reduce signal interference.

Physical layer module 214 may be configured to generate the physical links (baseband) between audio source 102 and primary wireless headphone 104 according to the short-range wireless communication protocol and the amended short-range wireless communication protocol used by first RF module 210 and second RF module 212, respectively. For example, physical layer module 214 may generate baseband packets (e.g., BLUETOOTH packets) based on the music and/or voice data (payload) and perform error correction using any known methods, such as FEC and ARQ. MAC layer module 216 may be configured to generate the logical data channel links between audio source 102 and primary wireless headphone 104 according to the short-range wireless communication protocol and between primary wireless headphone 104 and secondary wireless headphone 106 according to the amended short-range wireless communication protocol used by first RF module 210 and second RF module 212, respectively. For example, MAC layer module 216 may generate link control channel, link manager channel, user asynchronous channel, user isochronous channel, and user synchronous channel based on the BLUETOOTH protocol (and the amended BLUETOOTH protocol). HCI 218 may be configured to provide a common interface to physical layer module 214 and MAC layer module 216 and access to hardware status and control registers. For example, when implementing the BLUETOOTH protocol (and the amended BLUETOOTH protocol), HCI 218 may provide a uniform method of accessing the BLUETOOTH baseband capabilities.

In some embodiments, the ECC messages are transmitted based on a standard BLUETOOTH protocol in network layers above a physical layer, for example, by MAC layer module 216 and HCI 218, and are transmitted based on an amended BLUETOOTH protocol in the physical layer, for example, by physical layer module 214. For example, the ECC messages can be transmitted at a higher symbol rate than the standard BLUETOOTH protocol in the physical layer, for example, by physical layer module 214 according to the amended BLUETOOTH protocol. In some embodiments, the symbol rate for transmitting the ECC messages in the physical layer is 2M/s, which is higher than the standard BLUETOOTH symbol rate of 1M/s. By increasing the symbol rate in the physical layer for the ECC messages, more ECC messages can be transmitted, thereby improving the error correction capability.

Control module 220 may be configured to initiate the operation mode switch between first and second wireless headphones 104 and 106 in response to a mode switch event. The mode switch even may occur when primary wireless headphone 104 is not functioning well, such as being taken off from the ear canal and/or putting onto the charging station. Once the operation mode switch is initiated, control module 220 may be also configured to control the process or protocol of operation mode switch, for example, by causing primary wireless headphone 104 to sequentially transmit each operation mode switch-related message and status information based on a preset protocol as described below in detail. Control module 220 may be further configured to check each received switch ACK message from secondary wireless headphone 106 during the process of operation mode switch to continue, interrupt, or restart the process according to each received switch ACK message as described below in detail.

As described above, in some embodiments, primary wireless headphone 104 can either an ECC transmitting headphone or an ECC receiving headphone. In some embodiments, control module 220 may control primary wireless headphone 104 to switch between the ECC transmitting headphone and the ECC receiving headphone. In some embodiments, control module 220 may determine whether to switch the ECC headphone mode of primary wireless headphone 104 based on one or more parameters associated with primary wireless headphone 104 and/or secondary wireless headphone 106, such as signal quality. In one example, control module 220 may determine whether the signal quality is above a threshold and cause primary wireless headphone 104 to switch to a different ECC headphone mode. That is, in some embodiments, the wireless headphone with the relatively poor signal quality may be used as the ECC transmitting headphone, while the wireless headphone with the relatively good signal quality may be used as the ECC receiving headphone, so that the global ACK messages transmitted by the ECC receiving headphone can be more easily received by audio source 102. In some embodiments, the wireless headphone with the relatively poor signal quality may be used as the ECC receiving headphone, while the wireless headphone with the relatively good signal quality may be used as the ECC transmitting headphone, so that more ECC messages can be generated to reduce the times of re-transmission.

Secondary wireless headphone 106 in this example may include a wireless transceiver (secondary wireless transceiver) configured to receive (e.g., snoop) the audio information transmitted by audio source 102 and transmit or receive ECC messages in response to the reception of the audio information to audio source 102. The wireless transceiver may be also configured to receive the link information and status information from primary wireless headphone 104, which enable secondary wireless headphone 106 to establish a new normal short-range wireless link with audio source 102 upon operation mode switch. The wireless transceiver may be further configured to receive other operation mode switch-related messages, such as switch initiate messages and switch start messages, from primary wireless headphone 104, as well as transmit switch ACK messages to primary wireless headphone 104 during the operation mode switch. Secondary wireless headphone 106 may include other components, such as an enclosure, speakers, and a microphone (not shown). Secondary wireless transceiver may include an antenna 222, a first RF module 224, a second RF module 226, a physical layer module 228, a MAC layer module 230, an HCI 232, and a control module 234. Some or all of the modules mentioned above may be integrated in the same IC chip to reduce the chip size and/or power consumption. Secondary wireless headphone 106 may present at least part of the audio information to the user via one of the user's ear. For example, the speaker of secondary wireless headphone 106 may play music and/or voice based on the audio information or one audio channel of the audio information.

In this example, secondary wireless headphone 106 has the same hardware structures as primary wireless headphone 104. The functions of each module mentioned above in secondary wireless headphone 106 are the same as the counterparts in primary wireless headphone 104 and thus, will not be repeated. Different from primary wireless headphone 104, secondary wireless headphone 106 in this example works in the snoop mode prior to the completion of operation mode switch, so that audio source 102 may not recognize the connection with secondary wireless headphone 106. To enable secondary wireless headphone 106 to work in the snoop mode, in some embodiments, second RF module 212 of primary wireless headphone 104 may transmit, to second RF module 226 of secondary wireless headphone 106, link information associated with the short-range wireless communication protocol used between audio source 102 and primary wireless headphone 104. The link information may include any parameters necessary for enabling secondary wireless headphone 106 to snoop the communications between audio source 102 and primary wireless headphone 104, such as the address of audio source 102 (e.g., the IP address or MAC address) and the encryption parameters used between audio source 102 and primary wireless headphone 104. Moreover, to enable secondary wireless headphone 106 to switch to the normal mode, second RF module 212 of primary wireless headphone 104 may transmit, to second RF module 226 of secondary wireless headphone 106, status link information associated with the short-range wireless communication protocol used between audio source 102 and primary wireless headphone 104. The status information may include status information transmitted from primary wireless headphone 104 to audio source 102, such as status information about the BLUETOOTH upper layer protocol.

Control module 234 of secondary wireless headphone 106 may be configured to coordinate with control module 220 of primary wireless headphone 104 during the operation mode switch, for example, by causing first RF module 224 of secondary wireless headphone 106 to transmit each switch ACK message to primary wireless headphone 104 upon receive a corresponding operation mode switch-related message or status information from primary wireless headphone 104 based on the protocol of the operation mode switch, as described below in detail.

As described above, similar to control module 220 of primary wireless headphone 104, control module 234 of secondary wireless headphone 106 may control secondary wireless headphone 106 to switch between the ECC transmitting headphone and the ECC receiving headphone, according to some embodiments. The switch may be determined based on one or more parameters, such as the relative signal quality between primary wireless headphone 104 and secondary wireless headphone 106. For example, both control modules 220 and 234 may work together to switch the ECC headphone modes of primary wireless headphone 104 and secondary wireless headphone 106 to improve the overall performance of the pair of wireless headphones 104 and 106 as described above in detail. Control module 234 may be further configured to control the generation of the ECC messages based on the successfully received audio information when secondary wireless headphone 106 is working as an ECC transmitting headphone or control the correction of the audio information based on the received ECC when secondary wireless headphone 106 is working as an ECC receiving headphone.

Although in FIG. 2, the same physical layer module, MAC layer module, and HCI are used for both first and second RF modules 210 and 212 or 224 and 226, it is understood that in some embodiments, each of first and second RF modules 210 and 212 or 224 and 226 may have its own physical layer module, MAC layer module, and/or HCI. In other words, each of primary and secondary wireless headphones 104 and 106 may include two physical layer modules, two MAC layer modules, and/or two HCIs. As a result, two different types of short-range wireless communications can be implemented by each of primary and secondary wireless headphones 104 and 106. In some embodiments, second RF modules 212 and 226 and their respective physical layer modules, MAC layers modules, and/or HCIs are used to implement WiFi communication or NFMI communication between primary and secondary wireless headphones 104 and 106 for transmitting and receiving error correcting messages. In one example, the two different types of short-range wireless communications work on different RF bands, e.g., 2.4 GHz/5.8 GHz and 5 MHz to 50 MHz, at the same time to increase the bandwidth between primary and secondary wireless headphones 104 and 106. The symbol rate of each of first and second RF modules 210, 212, 224, and 226 may be 1 M, 2M, or 3M symbols/sec.

Figure 3:
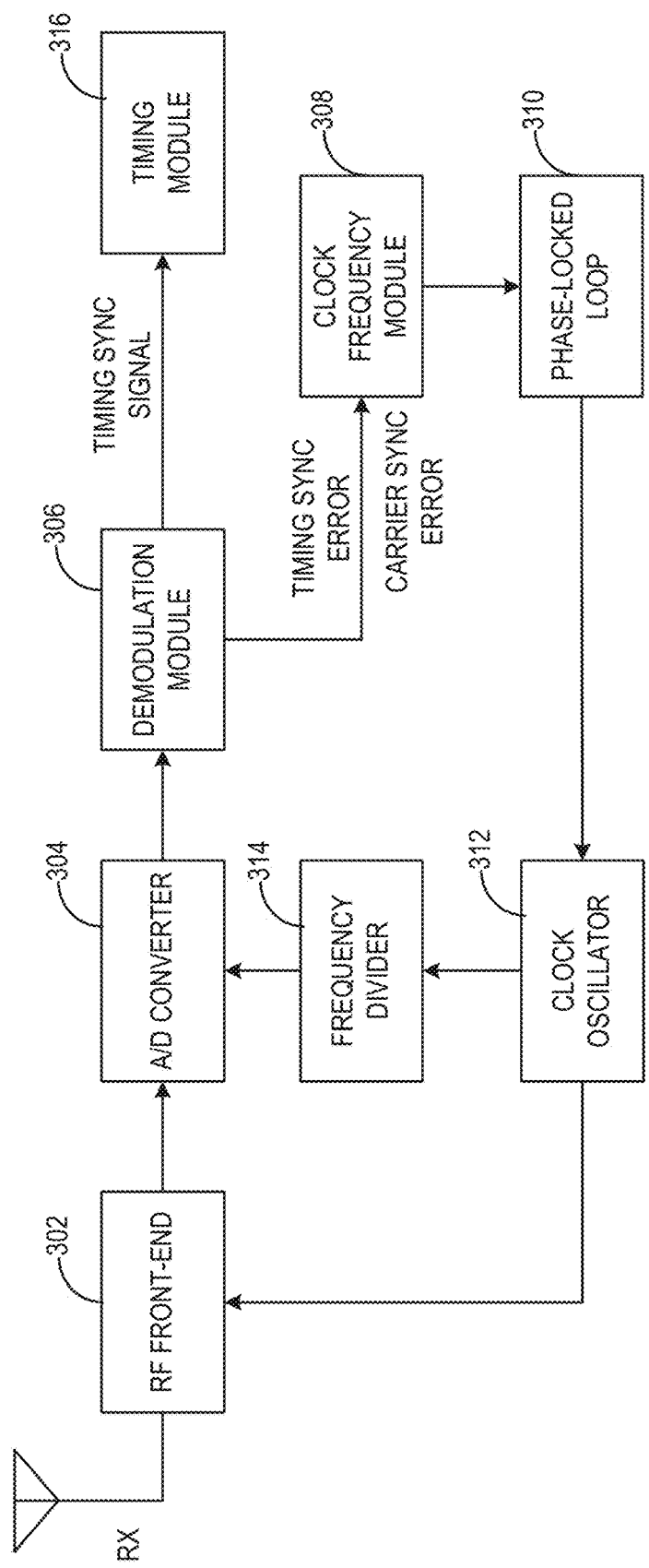
FIG. 3 is a block diagram illustrating an exemplary wireless headphone in accordance with some embodiments.

FIG. 3 is a block diagram illustrating exemplary wireless headphone 104 or 106 in accordance with some embodiments. In this example, each of primary wireless headphone 104 and secondary wireless headphone 106 includes an RF front-end 302, an analog-to-digital (A/D) converter 304, a demodulation module 306, a clock frequency module 308, a phase-locked loop (PLL) 310, a clock oscillator 312, a frequency divider 314, and a timing module 316. RF front-end 302 may be operatively coupled to an antenna and configured to receive the RF signals, such as audio signals representing the audio information described above in detail. RF front-end 302 may include an antenna switch, low-noise amplifier (LNA), power amplifier (PA), filter, etc. A/D converter 304 may be operatively coupled to RF front-end 302 and configured to convert an audio signal from an analog signal to a digital signal and provide the digital audio signal to demodulation module 306 that is operatively coupled to A/D converter 304. The A/D conversion may be performed by A/D converter 304 based on an A/D sampling rate determined by frequency divider 314.

In some embodiments, primary wireless headphone 104 and secondary wireless headphone 106 may be synchronized via their communications with audio source 102. The local clocks of each of primary wireless headphone 104 and secondary wireless headphone 106 may be synchronized with the remote clock of audio source 102 and thus, are synchronized with one another. By indirectly synchronizing primary wireless headphone 104 and secondary wireless headphone 106 via audio source 102, the sound can be simultaneously played by both primary wireless headphone 104 and secondary wireless headphone 106. One example of indirectly synchronizing primary wireless headphone 104 and secondary wireless headphone 106 via audio source 102 is disclosed in corresponding U.S. patent application Ser. No. 15/939,258, having a title "SYNCHRONIZATION OF WIRELESS HEADPHONES," which is incorporated herein by reference.

Figure 4:
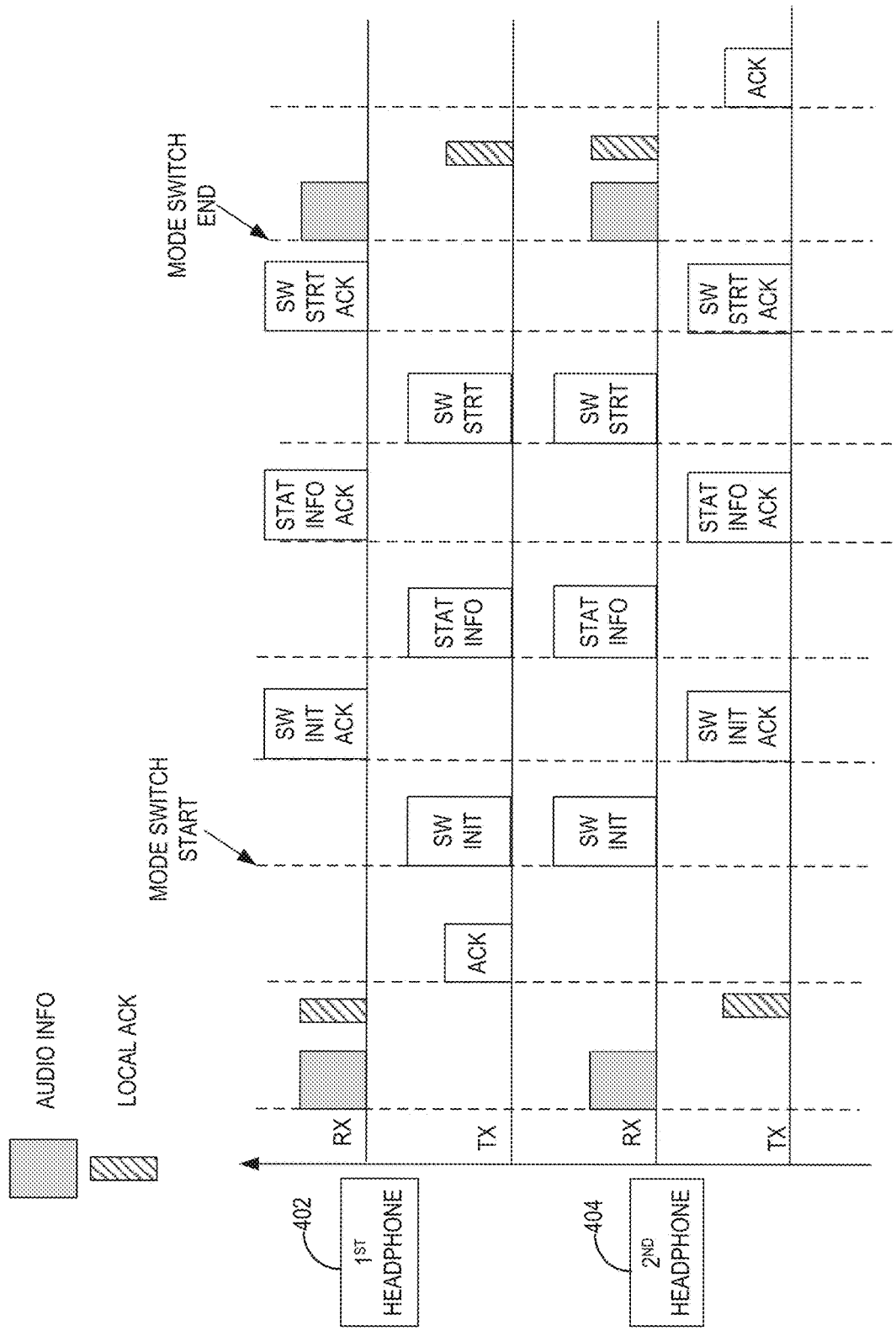
FIG. 4 is a timing diagram of operation mode switch in an exemplary wireless audio system in accordance with some embodiments.

FIG. 4 is a timing diagram of operation mode switch in an exemplary wireless audio system in accordance with some embodiments. The wireless audio system may include a first wireless headphone 402 and a second wireless headphone 404. First wireless headphone 402 may be primary wireless headphone 104 initially working in the normal mode and later switching to a secondary wireless headphone working in the snoop mode, whereas second wireless headphone 404 may be secondary wireless headphone 106 initially working in the snoop mode and later switching to a primary wireless headphone working in the normal mode.

Prior to any mode switch event occurs, first wireless headphone 402 may work in the normal mode, i.e., receive audio information from an audio source over a first short-range wireless link with the audio source (e.g., a normal bidirectional short-range wireless link, such as an ACL link or SCO link). In some embodiments, first wireless headphone 402 also transmits link information associated with the first short-range wireless link to second wireless headphone 404 over a second short-range wireless link with second wireless headphone 404 (e.g., a private bidirectional short-range wireless link, such as a L2CAP link) to enable second wireless headphone 404 to establish a third short-range wireless link with the audio source (e.g., a snoop bidirectional short-range wireless link, such as an ACL link or SCO link). Second wireless headphone 404 then may work in the snoop mode, i.e., snoop audio information from the audio source over the third short-range wireless link with the audio source.

Depending on whether the reception of the audio information is successful, second wireless headphone 404 may transmit a local ACK message (either ACK or NACK) to first wireless headphone 402. Upon receiving the local ACK message from second wireless headphone 404, first wireless headphone 402 may determine whether the receptions of the audio information by both first and second wireless headphones 402 and 404 are successful, e.g., first wireless headphone 402 successfully receives the audio information and second wireless headphone 404 successfully snoops the audio information, and transmit a global ACK message (either ACK or NACK) to the audio source accordingly. Until now, first wireless headphone 402 keeps working as a primary wireless headphone in the normal mode, and second wireless headphone 404 keeps working as a secondary wireless headphone in the snoop mode.

In any time when a mode switch event occurs, the operation mode switch between first and second wireless headphones 404 is triggered. The mode switch event may be any suitable events that either intentionally triggered by the user of the wireless audio system or any preset events, such as any event that may cause the current primary wireless headphone (e.g., first wireless headphone 402) not function well, for example, being left the ear canal and/or put onto the charging station. When the operation mode switch process starts, first wireless headphone 402 first transmits a switch initiate message for initiating the mode switch to second wireless headphone 404 over the second short-range wireless link. Second wireless headphone 404 is notified the start of the mode switch process by receiving the switch initiate message and transmits a switch initiate ACK message back to first wireless headphone 402 indicative of whether second wireless headphone 404 is ready for the mode switch process. Depending on the received switch initiate ACK message (whether it is ACK or NACK), first wireless headphone 402 then determines whether to proceed to the next step of the mode switch process, i.e., transmitting the status information associated with the first short-range wireless link. In case the switch initiate ACK message is NACK, i.e., second wireless headphone 404 is not ready yet, the operation mode switch process may be restarted by first wireless headphone 402, for example, by resending a switch initiate message to second wireless headphone 404.

In response to second wireless headphone 404 successfully receiving the switch initiate message (e.g., first wireless headphone 402 receiving ACK from second wireless headphone 404), first wireless headphone 402 then transmits the status information associated with the first short-range wireless link (e.g., status information about BLUETOOTH upper layer protocols) to second wireless headphone 404 over the second short-range wireless link. Second wireless headphone 404 receives the status information and transmits a status information ACK message back to first wireless headphone 402 indicative of whether second wireless headphone 404 successfully receives the status information. Depending on the received status information ACK message (whether it is ACK or NACK), first wireless headphone 402 then determines whether to proceed to the next step of the mode switch process, i.e., transmitting a switch start message. In case the status information ACK message is NACK, i.e., second wireless headphone 404 does not successfully receive the status information, the operation mode switch process may wait for a certain time period and check again, or may be restarted by first wireless headphone 402, for example, by resending the status information or even a switch initiate message to second wireless headphone 404.

In response to second wireless headphone 404 successfully receiving the status information (e.g., first wireless headphone 402 receiving ACK from second wireless headphone 404), first wireless headphone 402 then transmits a switch start message to second wireless headphone 404 over the second short-range wireless link to switch modes of first and second wireless headphones 402 and 404. In some embodiments, once the switch start message is sent, first wireless headphone 402 switches to a secondary wireless headphone in the snoop mode regardless of whether it receives a switch start ACK message from second wireless headphone 404. That is, the first short-range wireless link between first wireless headphone 402 and the audio source now becomes a snoop short-range wireless link. Second wireless headphone 404 receives the switch start message and switches to a primary wireless headphone working in the normal mode. That is, the third short-range wireless link between second wireless headphone 404 and the audio source now becomes a normal short-range wireless link. Second wireless headphone 404 may transmit a switch start ACK message back to first wireless headphone 402 indicative of whether second wireless headphone 404 successfully receives the switch start message. In some embodiments, second wireless headphone 404 switches to the snoop mode after receiving the switch start message regardless of whether it transmits the switch start ACK message to first wireless headphone 402.

In any event, the operation mode switch process ends after the switch start ACK message. First wireless headphone 402 now becomes a secondary wireless headphone working in the snoop mode, and second wireless headphone 404 now becomes a primary wireless headphone working in the normal mode. In some embodiments, second wireless headphone 404 receives audio information from the audio source over the third short-range wireless link with the audio source (e.g., now a normal bidirectional short-range wireless link, such as an ACL link or SCO link). In some embodiments, first wireless headphone 402 snoops the audio information from the audio source over the first short-range wireless link with the audio source (e.g., now a snoop short-range wireless link, such as an ACL link or SCO link). Depending on whether the reception of the audio information is successful, first wireless headphone 402 now may transmit a local ACK message (either ACK or NACK) to second wireless headphone 404. Upon receiving the local ACK message from first wireless headphone 402, second wireless headphone 404 may determine whether the receptions of the audio information by both first and second wireless headphones 402 and 404 are successful, e.g., second wireless headphone 404 successfully receives the audio information and first wireless headphone 402 successfully snoops the audio information, and transmit a global ACK message (either ACK or NACK) to the audio source accordingly.

As shown in FIG. 4 and described above, since second wireless headphone 404 works in the snoop mode before the mode switch event, i.e., it has already established the third short-range wireless link with the audio source, there is no need to spend time on waiting and confirming that second wireless headphone 404 is connected with the audio source. As a result, the time cost for operation mode switch is between "Mode Switch Start" and "Mode Switch End" labeled in FIG. 4, which can be very fast, such as less than 10 ms.

Figure 5:
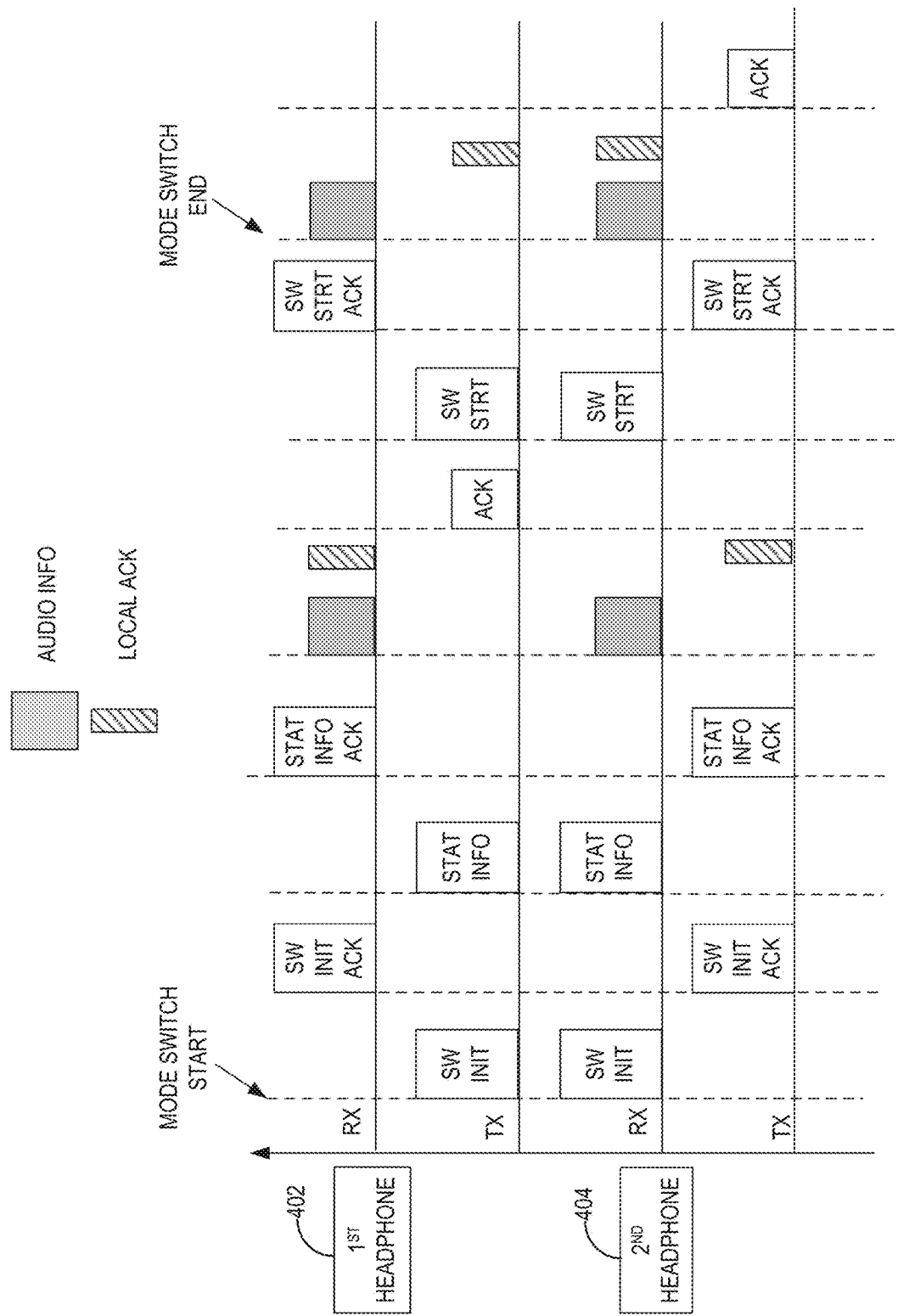
FIG. 5 is another timing diagram of operation mode switch in an exemplary wireless audio system in accordance with some embodiments.

Moreover, since second wireless headphone 404 keeps working in the snoop mode and first wireless headphone 402 keeps working the normal mode even during the process of operation mode switch after the mode switch event occurs, first and second wireless headphones 402 and 404 can keep receiving audio information during the process of operation mode switch. That is, the operation mode switch can occur seamlessly without disrupting the communications within the wireless audio system (including transmitting audio information and firmware update). For example, FIG. 5 is another timing diagram of operation mode switch in an exemplary wireless audio system in accordance with some embodiments. As shown in FIG. 5, after the mode switch starts but prior to first wireless headphone 402 transmits the switch start message, if the audio source transmits audio information, first wireless headphone 402 receives the audio information from the audio source over the third short-range wireless link with the audio source (e.g., still a normal bidirectional short-range wireless link), and second wireless headphone 404 snoops the audio information from the audio source over the third short-range wireless link with the audio source (e.g., still a snoop short-range wireless link). Depending on whether the reception of the audio information is successful, second wireless headphone 404 still transmits a local ACK message (either ACK or NACK) to first wireless headphone 402. Upon receiving the local ACK message from second wireless headphone 404, first wireless headphone 402 may determine whether the receptions of the audio information by both first and second wireless headphones 402 and 404 are successful, e.g., second wireless headphone 404 successfully snoops the audio information and first wireless headphone 402 successfully receives the audio information, and transmit a global ACK message (either ACK or NACK) to the audio source accordingly. The rest of timings in FIG. 5 is substantially similar to those in FIG. 4 and thus, will not be repeated.

Figure 6:
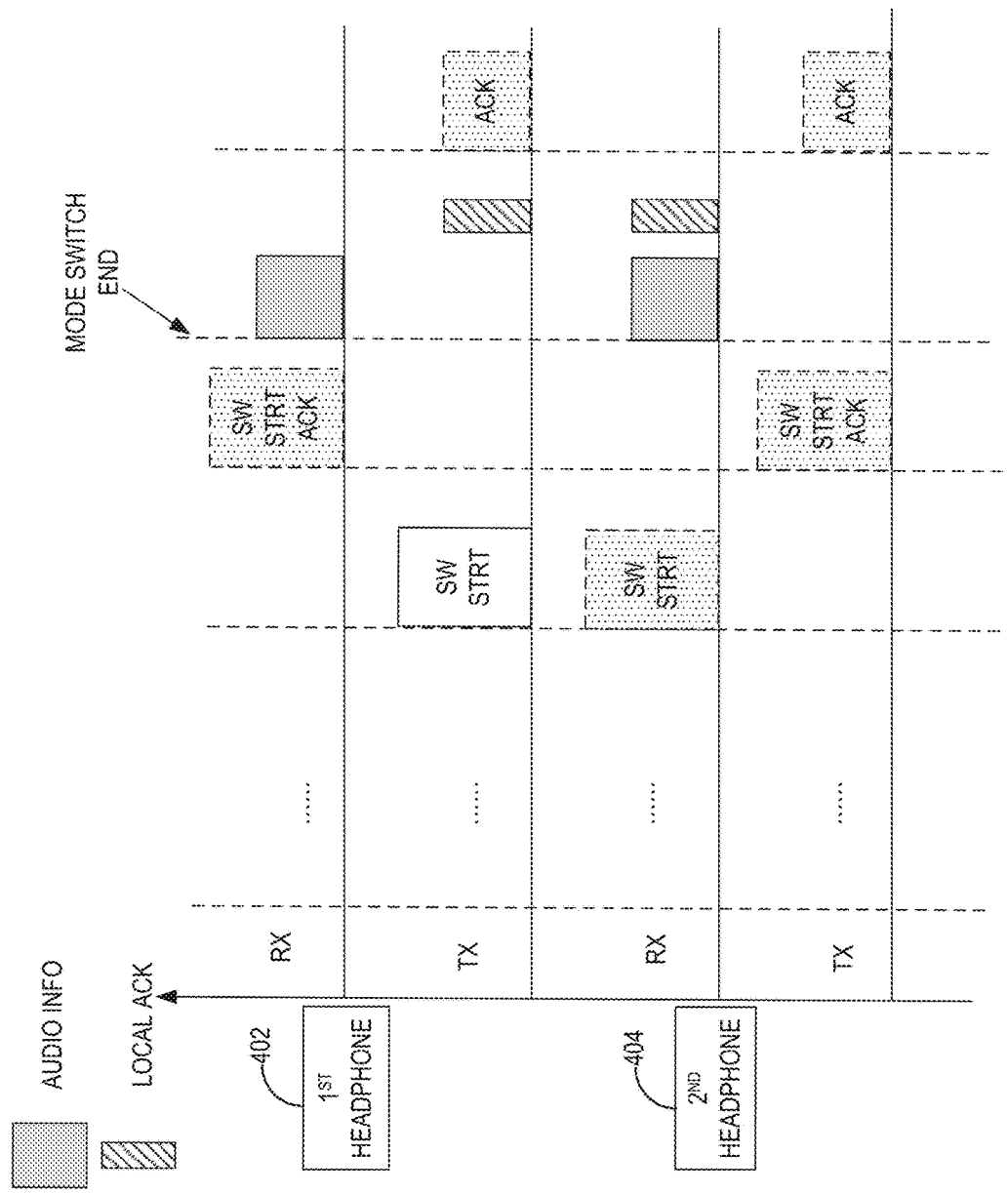
FIG. 6 is still another timing diagram of operation mode switch in an exemplary wireless audio system in accordance with some embodiments.

FIG. 6 is still another timing diagram of operation mode switch in an exemplary wireless audio system in accordance with some embodiments. In some embodiments, first wireless headphone 402 transmits the switch start message to second wireless headphone 404, but second wireless headphone 404 does not successfully receive the switch start message. As a result, although first wireless headphone 402 switches the first short-range wireless link to the snoop mode and becomes ready for snooping audio information, second wireless headphone 404 still remains in snoop mode. In this case, if the audio source starts to transmit audio information, although both first and second wireless headphones 402 and 404 can still snoop the audio information and each transmit a local ACK message to another, none of first and second wireless headphones 402 and 404 will transmit a global ACK message to the audio source as none of first and second wireless headphones 402 and 404 works in the normal mode. Without receiving a global ACK message, the audio source may resend the audio information. Once second wireless headphone 404 receives the switch start message and switches the third short-range wireless link to the normal mode, second wireless headphone 404 becomes primary wireless headphone and can transmit the global ACK message based on the local ACK message from first wireless headphone 402 to the audio source. The rest of timings in FIG. 6 is substantially similar to those in FIG. 4 and thus, will not be repeated.

Figure 7:
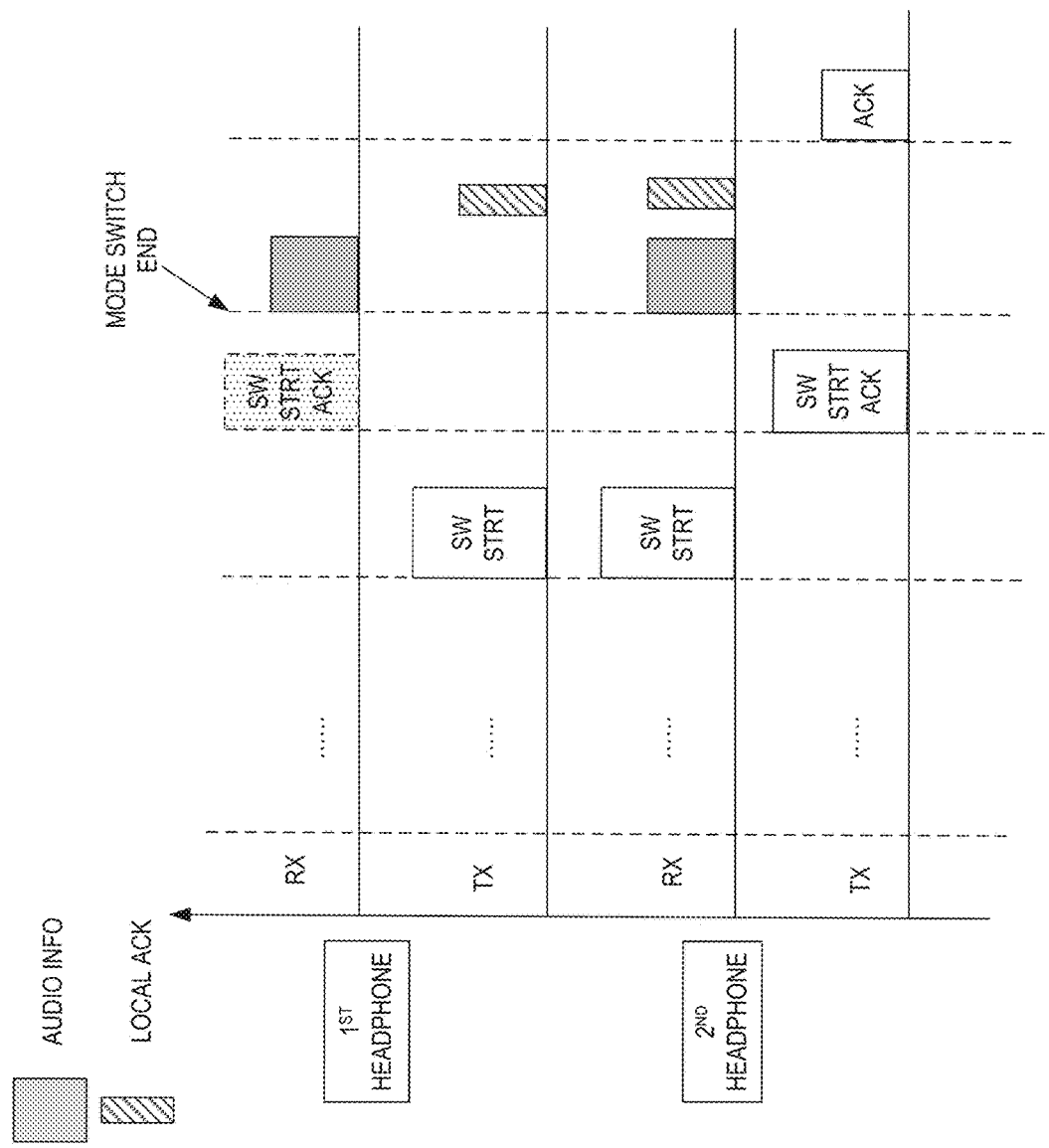
FIG. 7 is yet another timing diagram of operation mode switch in an exemplary wireless audio system in accordance with some embodiments.

As shown in FIG. 6, since second wireless headphone 404 does not successfully receive the switch start message from first wireless headphone 402, second wireless headphone 404 will not transmit a switch start ACK message back to first wireless headphone 402. FIG. 7 is yet another timing diagram of operation mode switch in an exemplary wireless audio system in accordance with some embodiments. As shown in FIG. 7, second wireless headphone 404 successfully receives the switch start message from first wireless headphone 402 and transmits a switch start ACK message, but first wireless headphone 402 fails to receive the switch start ACK message. In this case, since both first and second wireless headphones 402 and 404 have switched their operation modes after transmitting and receiving the switch start message, the failure of receiving the switch start ACK message will not affect the completion of the mode switch process. The rest of timings in FIG. 7 is substantially similar to those in FIG. 4 and thus, will not be repeated.

Figure 8:
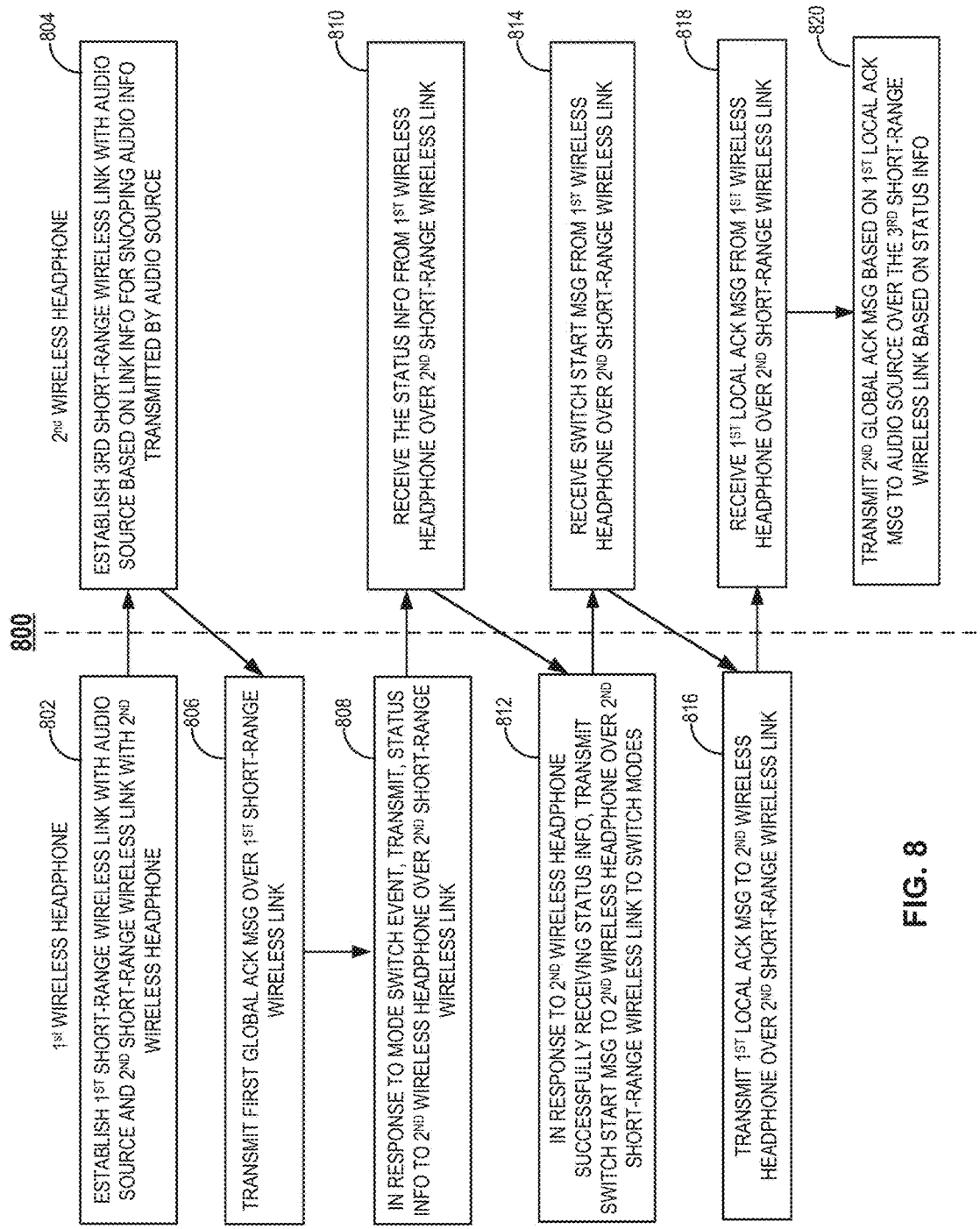
FIG. 8 is a flow chart illustrating an exemplary method for wirelessly communicating audio information in accordance with some embodiments.

FIG. 8 is a flow chart illustrating an exemplary method 800 for wirelessly communicating audio information in accordance with an embodiment. Method 800 can be performed by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than shown in FIG. 8, as will be understood by a person of ordinary skill in the art.

Method 800 shall be described with reference to FIGS. 1A, 1B, and 2. As shown in FIG. 8, operations 802, 806, 808, 812, and 816 may be performed by primary wireless headphone 104, and operations 804, 810, 814, 818, and 820 may be performed by secondary wireless headphone 106. However, method 800 is not limited to that exemplary embodiment. Starting at 802, a first short-range wireless link is established with an audio source, and a second short-range wireless link is established with a second wireless headphone. The first short-range wireless link may be an ACL link or a SCO link, and the second short-range wireless link may be a L2CAP link. In some embodiments, the audio information is received from the audio source over the first short-range wireless link. In some embodiments, link information associated with the first short-range wireless is transmitted to the second wireless headphone over the second short-range wireless link. The link information may include at least one of an address of the audio source, an encryption parameter between the audio source and the first wireless headphone, or a frequency-hopping spread spectrum (FHSS) parameter between the audio source and the first wireless headphone.

At 804, a third short-range wireless link is established with the audio source based on link information for snooping the audio information transmitted by the audio source over the first short-range wireless link. In some embodiments, the link information is received from the first wireless headphone over the second short-range wireless link. In some embodiments, the audio information is snooped over the first short-range wireless link using the third short-range wireless link based on the link information. In some embodiments, a local ACK message indicative of whether the second wireless headphone successfully snoops the audio information is transmitted to the first wireless headphone over the second short-range wireless link.

At 806, a first global ACK message indicative of whether the first wireless headphone and the second wireless headphone successfully receive the audio information is transmitted to the audio source over the first short-range wireless link. In some embodiments, the local ACK message is received from the second wireless headphone over the second short-range wireless first global, and the first global ACK message is transmitted based on the local ACK message to the audio source over the first short-range wireless link.

At 808, in response to a mode switch event, status information associated with the first short-range wireless link is transmitted to the second wireless headphone over the second short-range wireless link. The status information may include status information transmitted from the first wireless headphone to the audio source. In some embodiments, in response to the mode switch event and prior to transmitting the status information, a switch initiate message for initiating the mode switch is transmitted to the second wireless headphone over the second short-range wireless link. In some embodiments, in response to the second wireless headphone successfully receiving the switch initiate message, the status information is transmitted to the second wireless headphone over the second short-range wireless link At 810, the status information is received from the first wireless headphone over the second short-range wireless link. In some embodiments, prior to receiving the status information, the switch initiate message is received from the first wireless headphone over the second short-range wireless link, and a switch initiate ACK message indicative of whether the switch initiate message is successfully received is transmitted to the first wireless headphone over the second short-range wireless link.

At 812, in response to the second wireless headphone successfully receiving the status information, a switch start message is transmitted to the second wireless headphone over the second short-range wireless link to switch modes of the first and second wireless headphones. In some embodiments, after transmitting the switch start message, the audio information is snooped over the third short-range wireless link using the first short-range wireless link based on the link information.

At 814, the switch start message is received from the first wireless headphone over the second short-range wireless link. In some embodiments, after receiving the switch start message, the audio information is received based on the link information and the status information from the audio source over the third short-range wireless link.

At 816, after transmitting the switch start message, a local ACK message indicative of whether the first wireless headphone successfully snoops the audio information is transmitted to the second wireless headphone over the second short-range wireless link.

At 818, after receiving the switch start message, the local ACK message is received from the first wireless headphone over the second short-range wireless link. At 820, a second global ACK message indicative of whether the first wireless headphone and the second wireless headphone successfully receive the audio information based on the first local ACK message is transmitted to the audio source over the third short-range wireless link based on the status information.

In some embodiments, between transmitting the switch initiate message and transmitting the switch start message, the audio information is received from the audio source over the first short-range wireless link by the first wireless headphone, and is snooped over the first short-range wireless link using the third short-range wireless link based on the link information by the second wireless headphone. In some embodiments, a local ACK message indicative of whether the second wireless headphone successfully snoops the audio information is transmitted to the first wireless headphone over the second short-range wireless, and is received by the first wireless headphone over the second short-range wireless. In some embodiments, the first global ACK message based on the local ACK message is transmitted to the audio source over the first short-range wireless link.

In some embodiments, between transmitting the switch initiate message and transmitting the switch start message, firmware update is received by at least one of the first and second wireless headphones from the audio source.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure or the appended claims in any way.

While the present disclosure has been described herein with reference to exemplary embodiments for exemplary fields and applications, it should be understood that the present disclosure is not limited thereto. Other embodiments and modifications thereto are possible, and are within the scope and spirit of the present disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

The breadth and scope of the present disclosure should not be limited by any of the above-described exemplary embodiments, but should be defined only in accordance with the following claims and their equivalents.

What is claimed is:
1. A wireless audio system, comprising:
a first wireless headphone configured to:
    establish a first short-range wireless link with an audio source and a second short-range wireless link with a second wireless headphone;
    transmit, to the audio source over the first short-range wireless link, a first global acknowledgement (ACK) message indicative of whether the first wireless headphone and the second wireless headphone successfully receive audio information transmitted by the audio source;
    in response to a mode switch event, transmit, to the second wireless headphone over the second short-range wireless link, status information about a BLUETOOTH upper layer protocol and associated with the first short-range wireless link;
    in response to the second wireless headphone successfully receiving the status information, transmit, to the second wireless headphone over the second short-range wireless link, a switch start message to switch modes of the first and second wireless headphones; and
    after transmitting the switch start message, transmit, to the second wireless headphone over the second short-range wireless link, a first local ACK message indicative of whether the first wireless headphone successfully snoops the audio information; and
the second wireless headphone configured to:
    establish a third short-range wireless link with the audio source based on link information associated with the first short-range wireless link for snooping the audio information transmitted over the first short-range wireless link;
    receive, from the first wireless headphone over the second short-range wireless link, the status information;
    receive, from the first wireless headphone over the second short-range wireless link, the switch start message;
    after receiving the switch start message, receive, from the first wireless headphone over the second short-range wireless link, the first local ACK message; and
    transmit, to the audio source over the third short-range wireless link based on the status information, a second global ACK message indicative of whether the first wireless headphone and the second wireless headphone successfully receive the audio information based on the first local ACK message.

2. The wireless audio system of claim 1, wherein, prior to the mode switch event:
the first wireless headphone is further configured to:
    receive, from the audio source over the first short-range wireless link, the audio information; and
    transmit, to the second wireless headphone over the second short-range wireless link, the link information associated with the first short-range wireless;
the second wireless headphone is further configured to:
    receive, from the first wireless headphone over the second short-range wireless link, the link information; and snoop the audio information over the first short-range wireless link using the third short-range wireless link based on the link information.

3. The wireless audio system of claim 2, wherein, prior to the first wireless headphone transmitting the switch start message:
the second wireless headphone is further configured to transmit, to the first wireless headphone over the second short-range wireless, a second local ACK message indicative of whether the second wireless headphone successfully snoops the audio information; and
the first wireless headphone is further configured to:
receive, from the second wireless headphone over the second short-range wireless, the second local ACK message; and
transmit, to the audio source over the first short-range wireless link, the first global ACK message based on the second local ACK message.

4. The wireless audio system of claim 1, wherein:
after receiving the switch start message, the second wireless headphone is further configured to receive, from the audio source over the third short-range wireless link, the audio information based on the link information and the status information;
after transmitting the switch start message, the first wireless headphone is further configured to snoop the audio information over the third short-range wireless link using the first short-range wireless link based on the link information.

5. The wireless audio system of claim 1, wherein, in response to the mode switch event and prior to the first wireless headphone transmitting the status information, the first wireless headphone is further configured to:
transmit, to the second wireless headphone over the second short-range wireless link, a switch initiate message for initiating the mode switch; and
in response to the second wireless headphone successfully receiving the switch initiate message, transmit, to the second wireless headphone over the second short-range wireless link, the status information.

6. The wireless audio system of claim 5, wherein, between the first wireless headphone transmitting the switch initiate message and transmitting the switch start message:
the second wireless headphone is further configured to:
snoop the audio information over the first short-range wireless link using the third short-range wireless link based on the link information; and
transmit, to the first wireless headphone over the second short-range wireless, a second local ACK message indicative of whether the second wireless headphone successfully snoops the audio information; and
the first wireless headphone is further configured to:
receive, from the audio source over the first short-range wireless link, the audio information;
receive, from the second wireless headphone over the second short-range wireless, the second local ACK message; and
transmit, to the audio source over the first short-range wireless link, the first global ACK message based on the second local ACK message.

7. The wireless audio system of claim 5, wherein, between the first wireless headphone transmitting the switch initiate message and transmitting the switch start message, at least one of the first and second wireless headphones is further configured to receive firmware update from the audio source.

8. The wireless audio system of claim 1, wherein each of the first and third short-range wireless links is an asynchronous connection-oriented logical (ACL) link or a synchronous connection-oriented (SCO) link.

9. The wireless audio system of claim 1, wherein the second short-range wireless link is a logical link control and adaptation protocol (L2CAP) link.

10. The wireless audio system of claim 1, wherein the link information comprises at least one of an address of the audio source, an encryption parameter between the audio source and the first wireless headphone, or a frequency-hopping spread spectrum (FHSS) parameter between the audio source and the first wireless headphone.

11. The wireless audio system of claim 1, wherein the status information comprises status information transmitted from the first wireless headphone to the audio source.

12. A method for wirelessly communicating audio information, comprising:
establishing, by a first wireless headphone, a first short-range wireless link with an audio source and a second short-range wireless link with a second wireless headphone;
establishing, by the second wireless headphone, a third short-range wireless link with the audio source based on link information associated with the first short-range wireless link for snooping audio information transmitted by the audio source over the first short-range wireless link;
transmitting, by the first wireless headphone, a first global acknowledgement (ACK) message indicative of whether the first wireless headphone and the second wireless headphone successfully receive the audio information to the audio source over the first short-range wireless link;
in response to a mode switch event, transmitting, by the first wireless headphone, status information about a BLUETOOTH upper layer protocol and associated with the first short-range wireless link to the second wireless headphone over the second short-range wireless link;
receiving, by the second wireless headphone, the status information from the first wireless headphone over the second short-range wireless link;
in response to the second wireless headphone successfully receiving the status information, transmitting, by the first wireless headphone, a switch start message to the second wireless headphone over the second short-range wireless link to switch modes of the first and second wireless headphones;
receiving, by the second wireless headphone, the switch start message from the first wireless headphone over the second short-range wireless link;
after transmitting the switch start message, transmitting, by the first wireless headphone, a first local ACK message indicative of whether the first wireless headphone successfully snoops the audio information to the second wireless headphone over the second short-range wireless link;
after receiving the switch start message, receiving, by the second wireless headphone, the first local ACK message from the first wireless headphone over the second short-range wireless link; and
transmitting, by the second wireless headphone, a second global ACK message indicative of whether the first wireless headphone and the second wireless headphone successfully receive the audio information based on the first local ACK message to the audio source over the third short-range wireless link based on the status information.

13. The method of claim 12, further comprises, prior to the mode switch event:
receiving, by the first wireless headphone, the audio information from the audio source over the first short-range wireless link;
transmitting, by the first wireless headphone, the link information associated with the first short-range wireless to the second wireless headphone over the second short-range wireless link;
receiving, by the second wireless headphone, the link information from the first wireless headphone over the second short-range wireless link; and
snooping, by the second wireless headphone, the audio information over the first short-range wireless link using the third short-range wireless link based on the link information.

14. The method of claim 13, further comprising prior to transmitting the switch start message:
transmitting, by the second wireless headphone, a second local ACK message indicative of whether the second wireless headphone successfully snoops the audio information to the first wireless headphone over the second short-range wireless;
receiving, by the first wireless headphone, the second local ACK message from the second wireless headphone over the second short-range wireless; and
transmitting, by the first wireless headphone, the first global ACK message based on the second local ACK message to the audio source over the first short-range wireless link.

15. The method of claim 12, further comprising:
after receiving the switch start message, receiving, by the second wireless headphone, the audio information based on the link information and the status information from the audio source over the third short-range wireless link; and
after transmitting the switch start message, snooping, by the first wireless headphone, the audio information over the third short-range wireless link using the first short-range wireless link based on the link information.

16. The method of claim 12, further comprising:
in response to the mode switch event and prior to transmitting the status information, transmitting, by the first wireless headphone, a switch initiate message for initiating the mode switch to the second wireless headphone over the second short-range wireless link; and
in response to the second wireless headphone successfully receiving the switch initiate message, transmitting, by the first wireless headphone, the status information to the second wireless headphone over the second short-range wireless link.

17. The method of claim 16, further comprising, between transmitting the switch initiate message and transmitting the switch start message:
receiving, by the first wireless headphone, the audio information from the audio source over the first short-range wireless link;
snooping, by the second wireless headphone, the audio information over the first short-range wireless link using the third short-range wireless link based on the link information;
transmitting, by the second wireless headphone, a second local ACK message indicative of whether the second wireless headphone successfully snoops the audio information to the first wireless headphone over the second short-range wireless;
receiving, by the first wireless headphone, the second local ACK message from the second wireless headphone over the second short-range wireless; and
transmitting, by the first wireless headphone, the first global ACK message based on the second local ACK message to the audio source over the first short-range wireless link.

18. The method of claim 16, further comprising, between transmitting the switch initiate message and transmitting the switch start message, receiving, by at least one of the first and second wireless headphones, firmware update from the audio source.

19. The method of claim 12, wherein:
each of the first and third short-range wireless links is an asynchronous connection-oriented logical (ACL) link or a synchronous connection oriented (SCO) link; and
the second short-range wireless link is a logical link control and adaptation protocol (L2CAP) link.

20. The method of claim 12, wherein:
the link information comprises at least one of an address of the audio source, an encryption parameter between the audio source and the first wireless headphone, or a frequency-hopping spread spectrum (FHSS) parameter between the audio source and the first wireless headphone; and
the status information comprises status information transmitted from the first wireless headphone to the audio source.

21. The method of claim 12, wherein the transmitting and receiving of the status information, the transmitting and receiving of the switch start message, and the transmitting and receiving of the first local ACK message are performed seamlessly without disrupting the communication between the audio source and the first wireless headphone, the communication between the audio source and the second wireless headphone, and the communication between the first and second wireless headphone.

* * * * *